United States Patent
Natsume et al.

(10) Patent No.: US 6,893,305 B2
(45) Date of Patent: May 17, 2005

(54) SHIFT MECHANISM FOR MARINE PROPULSION UNIT

(75) Inventors: Noriyuki Natsume, Shizuoka (JP); Kazumasa Tanimoto, Shizuoka (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 10/899,905

(22) Filed: Jul. 27, 2004

(65) Prior Publication Data

US 2005/0026516 A1 Feb. 3, 2005

(30) Foreign Application Priority Data

Jul. 31, 2003 (JP) ........................................ 2003-204501

(51) Int. Cl.$^7$ ............................................. B63H 20/14
(52) U.S. Cl. ........................................................ 440/75
(58) Field of Search ........................................... 440/75

(56) References Cited

U.S. PATENT DOCUMENTS

| | | | | |
|---|---|---|---|---|
| 3,487,803 A | * | 1/1970 | Alexander, Jr. | 440/75 |
| 4,400,163 A | * | 8/1983 | Blanchard | 440/75 |
| 4,579,204 A | | 4/1986 | Iio | |
| 5,006,084 A | | 4/1991 | Handa | |
| 5,445,546 A | | 8/1995 | Nakamura | |
| 5,556,312 A | | 9/1996 | Ogino | |
| 5,556,313 A | | 9/1996 | Ogino | |
| 5,716,247 A | * | 2/1998 | Ogino | 440/75 |
| 5,788,546 A | | 8/1998 | Ogino | |
| 5,839,928 A | | 11/1998 | Nakayasu et al. | |
| 5,902,160 A | * | 5/1999 | Weronke et al. | 440/88 M |
| 5,910,191 A | | 6/1999 | Okamoto | |
| 6,062,360 A | * | 5/2000 | Shields | 192/21 |
| 6,123,591 A | | 9/2000 | Onoue | |

FOREIGN PATENT DOCUMENTS

| | | |
|---|---|---|
| JP | 59-073627 | 4/1984 |
| JP | 63-207794 | 8/1988 |

* cited by examiner

*Primary Examiner*—Stephen Avila
(74) *Attorney, Agent, or Firm*—Knobbe, Martens, Olson & Bear, LLP

(57) ABSTRACT

A marine propulsion unit has a driveshaft and propulsion shaft driven by the driveshaft and driving a propeller. The driveshaft carries a pinion. The propulsion shaft carries forward and reverse gears. The pinion meshes with the forward and reverse gears. The pinion drives the forward and reverse gears in opposite directions relative to each other. A sleeve is rotatable with the propulsion shaft. The sleeve is slidably disposed between the forward and reverse gears on the propulsion shaft. The forward and reverse gears have teeth on a surface thereof that opposes the sleeve. The sleeve has recesses on each surface thereof that opposes the forward or reverse gear. Each tooth can enter a corresponding recess. The tooth has a length substantially the same as a length of the recess in a circumferential direction.

8 Claims, 21 Drawing Sheets

| Clearance | 0° | 0.9° | 1.29° | 1.57° | 3° | 5° | 1.5° |
|---|---|---|---|---|---|---|---|
| Noise Level | 5 | 3.5 | 3 | 1.5 | 1 | 1 | 1 |
| Remarks | Welded | Midpoint of Tolerance | Upper Limit of Tolerance | | | | Clearance in Conventional Mechanism |

*Figure 18*

| Clearance (m m) | 0.00 | 0.36 | 0.52 | 0.63 | 1.21 | 2.02 | 6.05 |
|---|---|---|---|---|---|---|---|
| Noise Level | 5 | 3.5 | 3 | 1.5 | 1 | 1 | 1 |
| Remarks | Welded | Midpoint of Tolerance | Upper Limit of Tolerance | | | | Clearance in Conventional Mechanism |

*Figure 20*

SHIFT MECHANISM FOR MARINE PROPULSION UNIT

PRIORITY INFORMATION

This application is based on and claims priority to Japanese Patent Application No. 2003-204501, filed on Jul. 31, 2003, the entire contents of which is hereby expressly incorporated by reference.

BACKGROUND OF THE INVENTION

1. Field of the Invention

The present invention generally relates to a shift mechanism for a marine propulsion unit, and more particularly relates to an improved gear clutching construction for a marine propulsion unit.

2. Description of Related Art

Marine propulsion units, such as outboard motors, incorporate an engine as a prime mover to power a marine propulsion device. The propulsion device typically is a propeller and is submerged when an associated watercraft rests on a body of water. The engine typically is placed atop the outboard motor. A drive train and a transmission couple the engine with the propulsion device. Typically, the engine has a crankshaft extending generally vertically. The drive train includes a driveshaft disposed within a housing unit below the engine. The driveshaft also extends generally vertically and is connected to the crankshaft to transfer the power of the engine to a propulsion shaft which also is included in the drive train. The propulsion shaft extends generally normal to the driveshaft. The transmission couples the propulsion shaft with the driveshaft.

The outboard motor can incorporate a shift mechanism that shifts the transmission among forward, neutral and reverse modes. The forward and reverse modes are driving modes and the neutral mode is a non-driving mode. The propeller rotates in a direction such that the associated watercraft proceeds forward when the transmission is in the forward mode, while the propeller rotates in another direction such that the watercraft proceeds backward when the transmission is in the reverse mode. Otherwise, the propeller does not rotate due to engine output when the transmission is in the neutral mode because the propulsion shaft is decoupled from the driveshaft in this mode.

FIGS. 1–3 illustrate a typical arrangement of the shift mechanism and transmission. FIG. 1 is a partial side elevation view of a conventional outboard motor. FIG. 2 is an elevation view of a sleeve of the shift mechanism. FIG. 3 is a cross-sectional view of the sleeve taken along the line 3—3 of FIG. 2, the sleeve being coupled with a forward or reverse gear.

The shift mechanism, which is indicated by the reference numeral 20, shifts a transmission that includes a pinion 24 and forward and reverse gears 28, 30 among forward, reverse and neutral modes. The driveshaft 22 carries the pinion 24 at the shaft's bottom end. The propulsion shaft 26 carries the forward and reverse gears 28, 30 that always mesh with the pinion 24. The shift mechanism 20 includes a sleeve 32 that is slidably disposed between the forward and reverse gears 28, 30 on the propulsion shaft 26 and is coupled with the propulsion shaft 26 so as to rotate together with the propulsion shaft 26. The forward and reverse gears 28, 30 have teeth 34 and the sleeve 32 has recesses 36. The teeth 34 can engage with the recesses 36. The sleeve 32 is driven by the forward or reverse gear 28, 30 while the teeth 34 engage with walls of the recesses 36. That is, the driving force of the forward or reverse gear 28, 30 is transferred to the sleeve 32 from the gear 28, 30 while surfaces 38 of the teeth 34 abut on the surfaces 40 of the recesses 36. The propulsion shaft 26 and sleeve 32 thus can rotate with the driveshaft.

A mechanical shift actuator selectively connects the sleeve 32 either with the forward gear 28 or the reverse gear 30, or disconnects the sleeve 32 from both the forward and reverse gears 28, 30. Because the sleeve 32 is rotationally coupled with the propulsion shaft 26, the propulsion shaft 26 rotates in the forward propelling direction when connected with the forward gear 28, while the propulsion shaft 26 rotates in the reverse propelling direction when connected with the reverse gear 30. Otherwise, the propulsion shaft 26 is not driven for rotation by the engine when the sleeve 32 is not connected with either of the gears 28, 30. The shift mechanisms are disclosed, for example, in U.S. Pat. Nos. 4,579,204, 5,006,084, 5,445,546, 5,556,312, 5,556,313, 5,788,546, 5,839,928 and 6,123,591 and Japanese Patent Publications Nos. 59-73627 and 07-67918.

SUMMARY OF THE INVENTION

Such shift mechanisms can cause noise. The inventors have determined that one cause of the noise is repeated collisions between the surfaces 38 of the teeth 34 and the surfaces 40 of the recesses 36. That is, normally, the rotational speed of the propulsion shaft 26 does not fluctuate significantly because such fluctuation, if any, generally is negated by inertia or movement of the propeller caused by movement through the water. On the other hand, the rotational speed of the driveshaft 22 can experience significant fluctuation because the driveshaft 22 is directly coupled with the crankshaft, which rotation can have fluctuation due to variations in the engine's combustion cycles and also due to irregular combustion that occurs in the combustion chambers of the engine. Because the sleeve 32 rotates together with the propulsion shaft 26 while the forward and reverse gears 28, 30 rotate with the driveshaft 22, differences in rotational speed between the sleeve 32 and the gears 28, 30 can occur frequently. The frequent differences in the rotational speeds can cause frequent separation and collision of the teeth with the surfaces of the recesses. Noise thus results.

A need therefore exists for an improved shift mechanism for a marine propulsion unit that can reduce or eliminate noise made between teeth of a forward and/or reverse gear and the associated surfaces of the recesses of the sleeve.

One aspect of an embodiment of the present invention involves a marine propulsion unit comprising a first shaft adapted to be driven by a prime mover, a second shaft driven by the first shaft and driving a propulsion device. The first shaft carries a first gear, the second shaft carries second and third gears and the first gear meshes with the second and third gears. The first gear drives the second and third gears in opposite directions relative to each other. A sleeve is rotatable with the second shaft. The sleeve is slidably disposed on the second shaft between the second and third gears. The second and third gears each have a tooth on a surface thereof that opposes the sleeve. The sleeve has a recess on each surface thereof that opposes the second or third gear. Each tooth is capable of insertion into the associated recess. Each tooth also has a length substantially the same as a length of the associated recess in a circumferential direction.

Another aspect of an embodiment of the present invention involves a marine propulsion unit comprising a first shaft adapted to be driven by a prime mover, a second shaft driven by the first shaft and driving a propulsion device. The first shaft carries a first gear. The second shaft carries a second gear. The first gear meshes with the second gear. A sleeve is rotatable with the second shaft. The sleeve is slidably disposed on the second shaft. The second gear has a tooth on a surface thereof that opposes the sleeve. The sleeve has a recess on a surface thereof that opposes the second gear. The tooth is arranged to selectively mesh with the recess. The tooth has a length substantially the same as a length of the recess in a circumferential direction.

Another aspect of an embodiment of the present invention involves a marine propulsion unit comprising a first shaft adapted to be driven by a prime mover, a second shaft driven by the first shaft and driving a propulsion device, the first shaft carrying a first gear. The second shaft carrying a second gear. The first gear meshing with the second gear. The first gear driving the second gear. A sleeve rotatable with the second shaft. The sleeve is slidably disposed on the second shaft adjacent the second gear. The second gear has a tooth on a surface thereof that opposes the sleeve. The sleeve has a recess on a surface thereof that opposes the second gear. The tooth is adapted to enter the recess. The recess substantially confines the tooth against circumferential movement relative to the recess when the tooth is in the recess.

BRIEF DESCRIPTION OF THE DRAWINGS

These and other features, aspects and advantages of the present invention are described below with reference to the drawings of a preferred embodiment, which are intended to illustrate and not to limit the invention. As noted above, FIGS. 1–3 are provided in order to assist the reader's understanding of the conventional shift mechanism and for the reader to better appreciate the features, aspects and advantages associated with the present invention. The drawings of the preferred embodiment include 18 figures, in which;

FIG. 18 is a table showing noise levels versus clearances that separate a tooth of the forward or reverse gear and a recess of the sleeve obtained in an experiment, the clearances being indicated by angles in this table;

FIG. 20 is another table showing the noise levels versus the clearances obtained in the experiment, the clearances being indicated by lengths in this table.

DETAILED DESCRIPTION OF THE PREFERRED EMBODIMENTS

Figure 1:
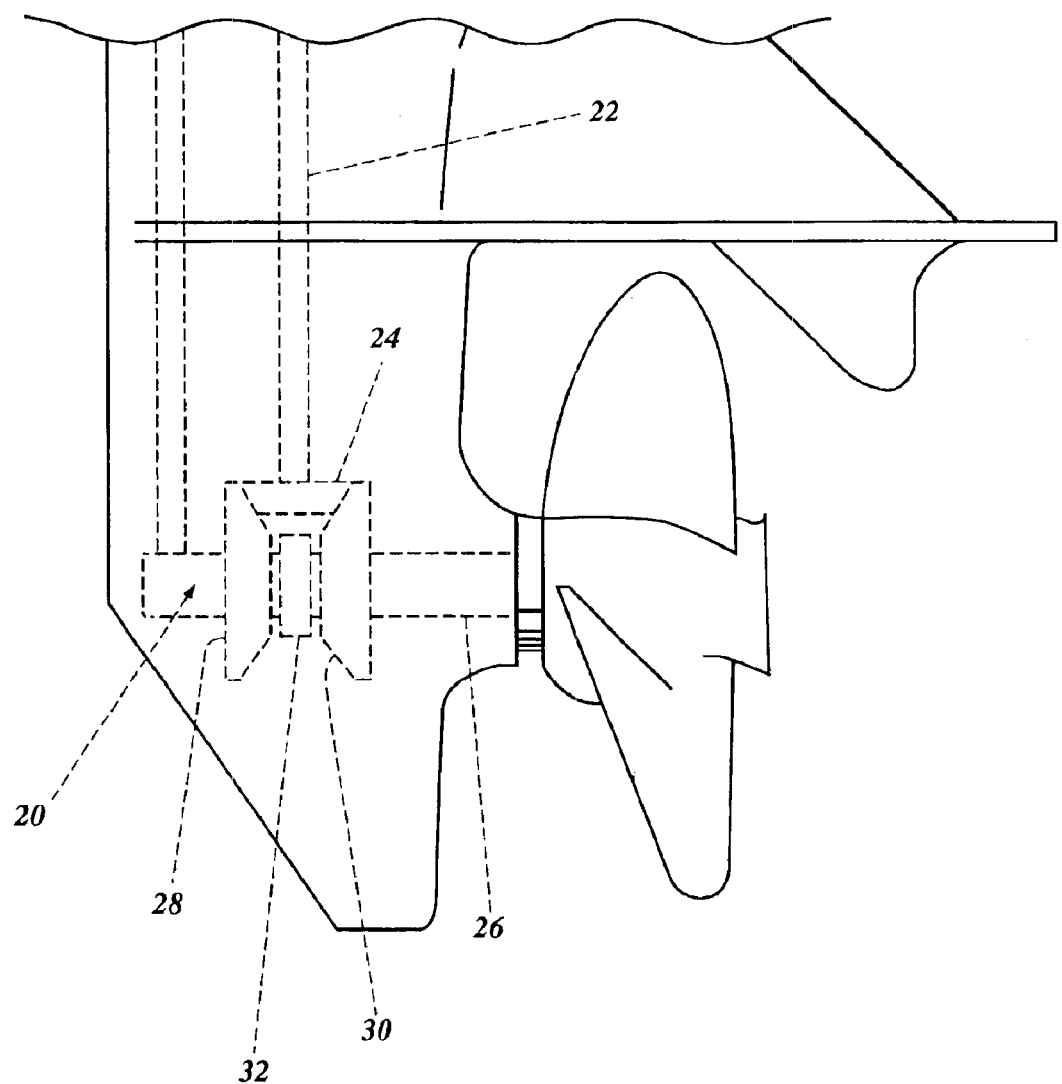
Figure 2:
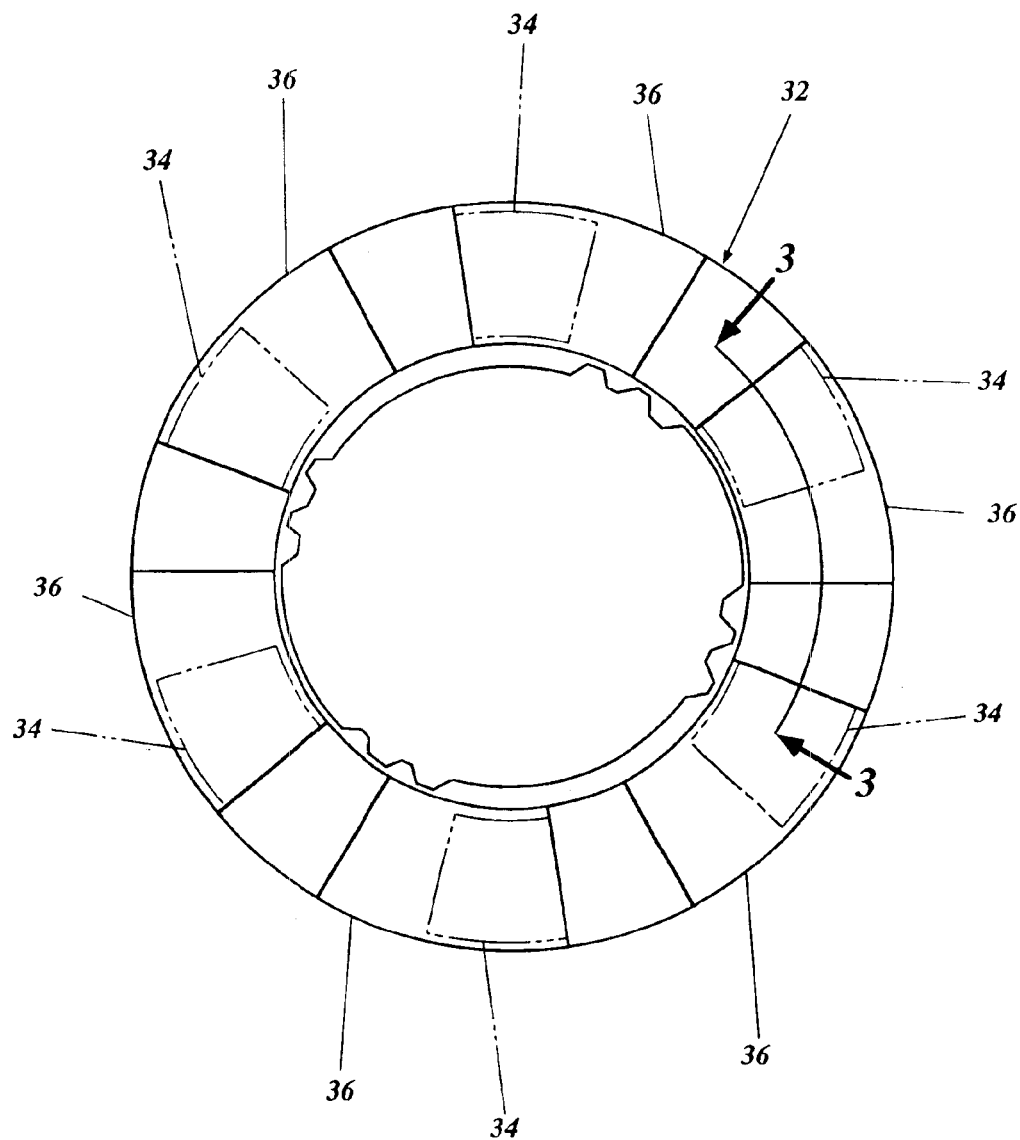
Figure 3:
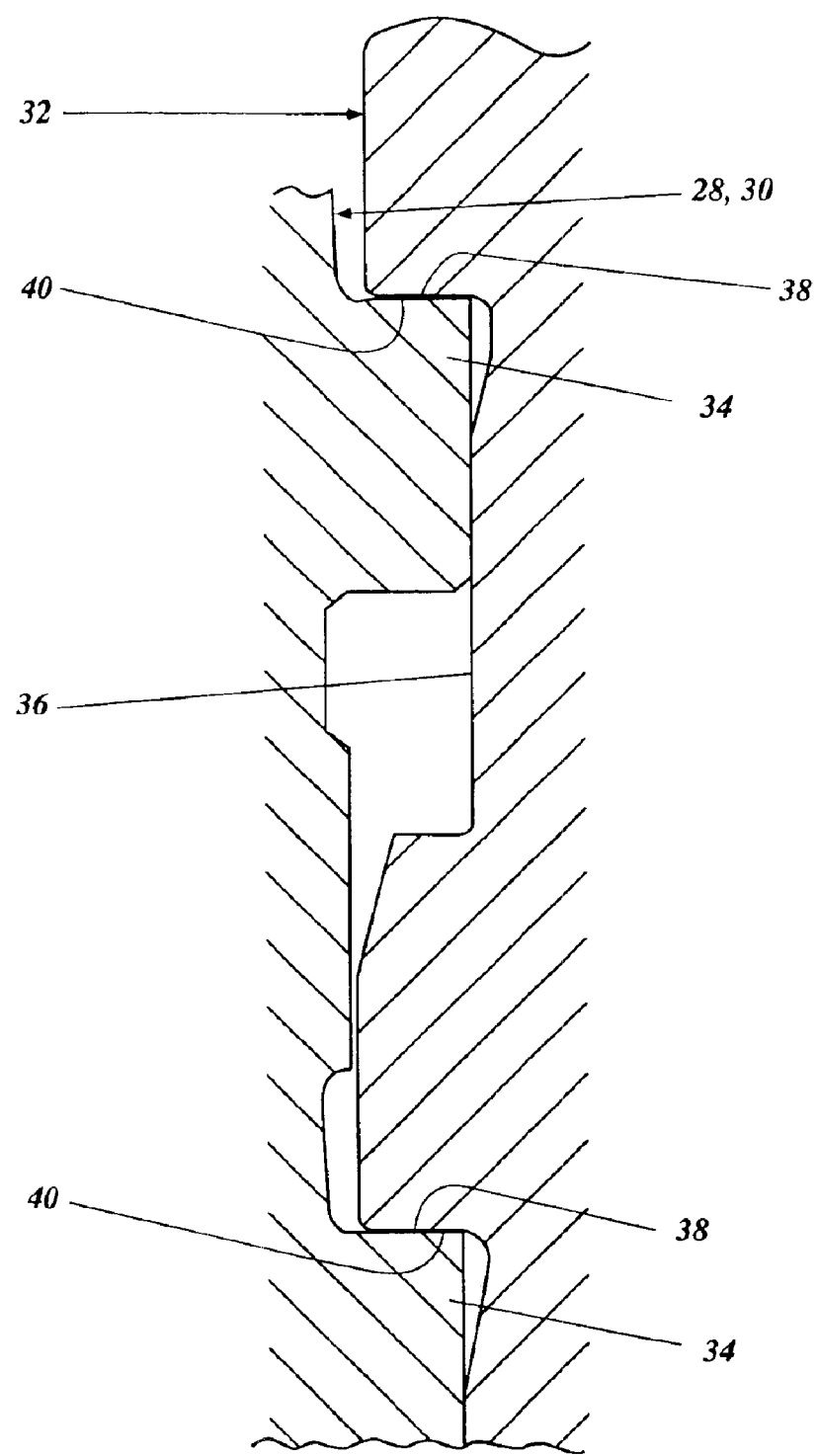
Figure 4:
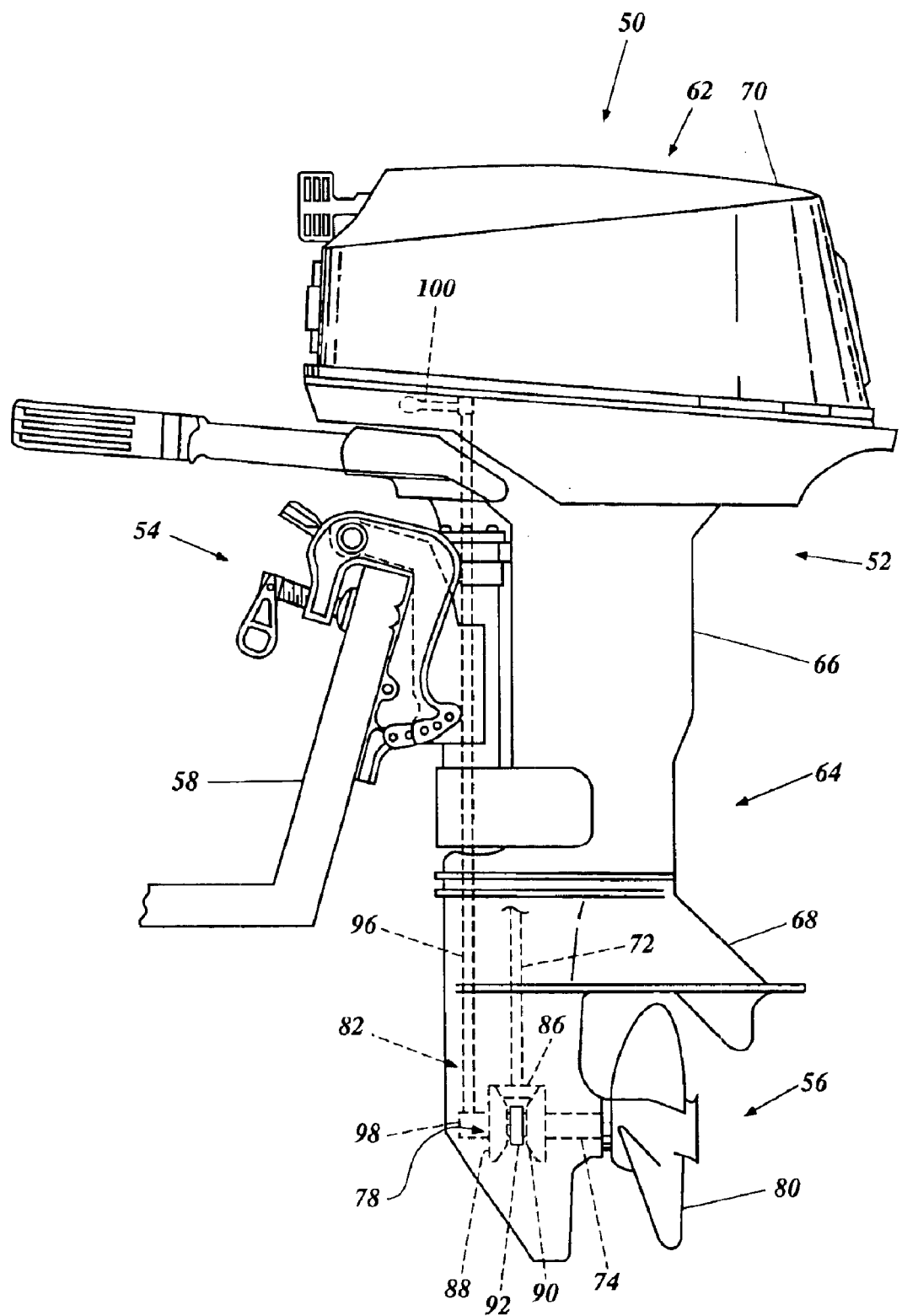
FIG. 4 illustrates a side elevation view of an outboard motor configured in accordance with certain features, aspects and advantages of the present invention.

With reference to FIG. 4, an overall construction of an outboard motor 50 configured in accordance with certain features, aspects and advantages of the present invention is described below. The outboard motor merely exemplifies one type of marine propulsion unit on which various aspects and features of the present invention can be suitably used. Other types of marine propulsion units such as, for example, outboard drives or stern drives for inboard/outboard systems can employ various features, aspects and advantages of the present invention.

The outboard motor 50 generally comprises a drive unit 52, a bracket assembly 54, and a propulsion device 56. The bracket assembly 54 supports the drive unit 52 on a transom of an associated watercraft 58 and places the propulsion device 56 in a submerged position when the watercraft 58 rests on a surface of a body of water. The drive unit 52 can move about a generally vertically extending steering axis and also move about a generally horizontally extending tilt axis.

As used through this description, the terms "forward," "forwardly" and "front" mean at or toward the side where the bracket assembly 54 is located, and the terms "rear," "reverse," "backward" and "rearward" mean at or toward the opposite side of the front side, unless indicated otherwise or otherwise readily apparent from the context use.

The illustrated drive unit 52 comprises a power head 62 and a housing unit 64. The housing unit 64 includes a driveshaft housing 66 and a lower unit 68.

The power head 62 is disposed atop the drive unit 52 and includes a prime mover. In the illustrated embodiment, the prime mover is an internal combustion engine (not shown) housed with a protective cowling assembly 70, which is another part of the power head 62. The engine preferably operates on a four stroke cycle principle. This type of engine, however, merely exemplifies one type of engine and any type of engine can be used.

The cowling assembly 70 preferably has an opening at its bottom end through which an upper portion of a support member extends. The support member preferably is affixed atop the driveshaft housing 66. The cowling assembly 70 and the support member together form a tray. The engine is placed onto this tray and is affixed to the support member. A crankshaft extends generally vertically through the engine. The crankshaft rotates with the reciprocal movement of one or more pistons of the engine which are coupled with the crankshaft, as is well known to the skilled persons in the art.

With continued reference to FIG. 4, the driveshaft housing 66 is disposed below the power head 62, and the lower unit 68 depends from the driveshaft housing 66. A driveshaft 72 extends generally vertically through the driveshaft housing 66 and the lower unit 68. The driveshaft housing 66 and the lower unit 68 journal the driveshaft 72. The driveshaft 72 is coupled with the crankshaft in a conventional manner and rotates with the crankshaft.

The lower unit 68 journals a propulsion shaft 74. The propulsion shaft 74 extends horizontally through the lower unit 68 and lies generally normal to the driveshaft 72 (i.e., at about a 90° shaft angle). The propulsion shaft 74 is coupled with the driveshaft 72 through a transmission 78 and is driven by the driveshaft 72.

The propulsion device 56 is mounted on the propulsion shaft 74 to rotate with the propulsion shaft 74. In the illustrated arrangement, the propulsion device 56 includes a propeller 80 that is affixed to an outer end of the propulsion shaft 74. The propulsion device, however, can take the form of a dual counter-rotating system, a hydrodynamic jet, or any of a number of other suitable propulsion devices. The propeller 80 rotates in either direction or does not rotate while the transmission 78 is preferably operable in a forward, reverse or neutral mode. A shift mechanism 82 shifts the transmission 78 among the forward, reverse and neutral modes.

The transmission 78 preferably comprises a pinion 86, a forward gear 88 and a reverse gear 90. The pinion 86 is affixed to a bottom end of the driveshaft 72. The forward and reverse gears 88, 90 are disposed on the propulsion shaft 74 to oppose each other with the pinion 86 positioned between the gears 88, 90. The forward and reverse gears 88, 90 mesh with the pinion 86. The shift mechanism 82 comprises a sleeve or dog clutch member 92 slidably disposed on the propulsion shaft 74 between the forward and reverse gears 88, 90. The sleeve 92 can rotate together with the propulsion shaft 74. In other words, the sleeve 92 cannot move significantly in a circumferential direction relative to the propulsion shaft 74. The sleeve 92 can engage with either the forward or reverse gear 88, 90.

When the sleeve 92 engages with the forward gear 88, the forward gear 88 rotates the sleeve 92 together with the propulsion-shaft 74 in one direction. This is the forward mode of the transmission 78. When the sleeve 92 engages with the reverse gear 90, the reverse gear 90 rotates the sleeve 92 together with the propulsion shaft 74 in the opposite direction. This is the reverse mode of the transmission 78. When the sleeve 92 does not engage with either the forward or reverse gear 88, 90, the sleeve 92 together with the propulsion shaft 74 is not driven by the driveshaft, i.e., the propulsion shaft 74 generally does not rotate due to operation of the engine. This is the neutral mode of the transmission 78. The propeller 80 propels the watercraft 58 forwardly in the forward mode, while the propeller 80 propels the watercraft 58 backwardly in the reverse mode. The propeller 80 does not propel the watercraft 58 either forwardly or backwardly in the neutral mode.

The shift mechanism 82 further comprises a shift actuator unit to move the sleeve 92 toward the forward gear 88 or the reverse gear 90. The shift actuator unit includes a shift rod 96 having an actuating cam, an actuating cam follower 98 and a shift lever 100. The shift rod 96 extends generally vertically through the housing unit 64. The actuating cam is attached to or unitarily formed with a bottom end of the shift rod 96. The actuating cam engages with the cam follower 98 and the cam follower 98 is coupled with the sleeve 92. The shift lever 100 is coupled with a top end of the shift rod 96 that extends to a location next to the protective cowling assembly 66. The shift lever 100 has positions corresponding to the forward, reverse and neutral modes of the transmission 78. When an operator of the outboard motor 66 operates the shift lever 100 to one of the positions, the actuating cam moves the cam follower 98. With the movement of the cam follower 98, the sleeve 92 slides on the propulsion shaft 74 to a position at which the sleeve 92 engages with the forward or reverse gear 88, 90 or a position at which the sleeve 92 does not engage with the forward or reverse gear 88, 90. Thus, the transmission 78 is shifted to either the forward, reverse or neutral mode.

With continued reference to FIG. 4 and with additional reference to FIGS. 5–16, a preferred embodiment of the shift mechanism 82 is described in greater detail below.

A bearing 104 preferably journals the bottom end of the driveshaft 72. The pinion 86 is coupled to the bottom end of the driveshaft 72 to rotate together about an axis of the driveshaft 72. Bearings 106 preferably journal the propulsion shaft 74 via the forward and reverse gears 88, 90, respectively. The forward gear 88 is rotatably disposed on the propulsion shaft 74 relative to the propulsion shaft 74 unless the sleeve 92 engages with the first gear 88. In a similar manner, the reverse gear 90 is rotatably disposed on the propulsion shaft 74 relative to the propulsion shaft 74 unless the sleeve 92 engages with the second gear 90. In other words, the forward and reverse gears 88, 90 can rotate on the propulsion shaft 74 if the sleeve 92 stays between the forward and reverse gears 88, 90 and does not engage with either the forward or reverse gear 88, 90.

Figure 8:
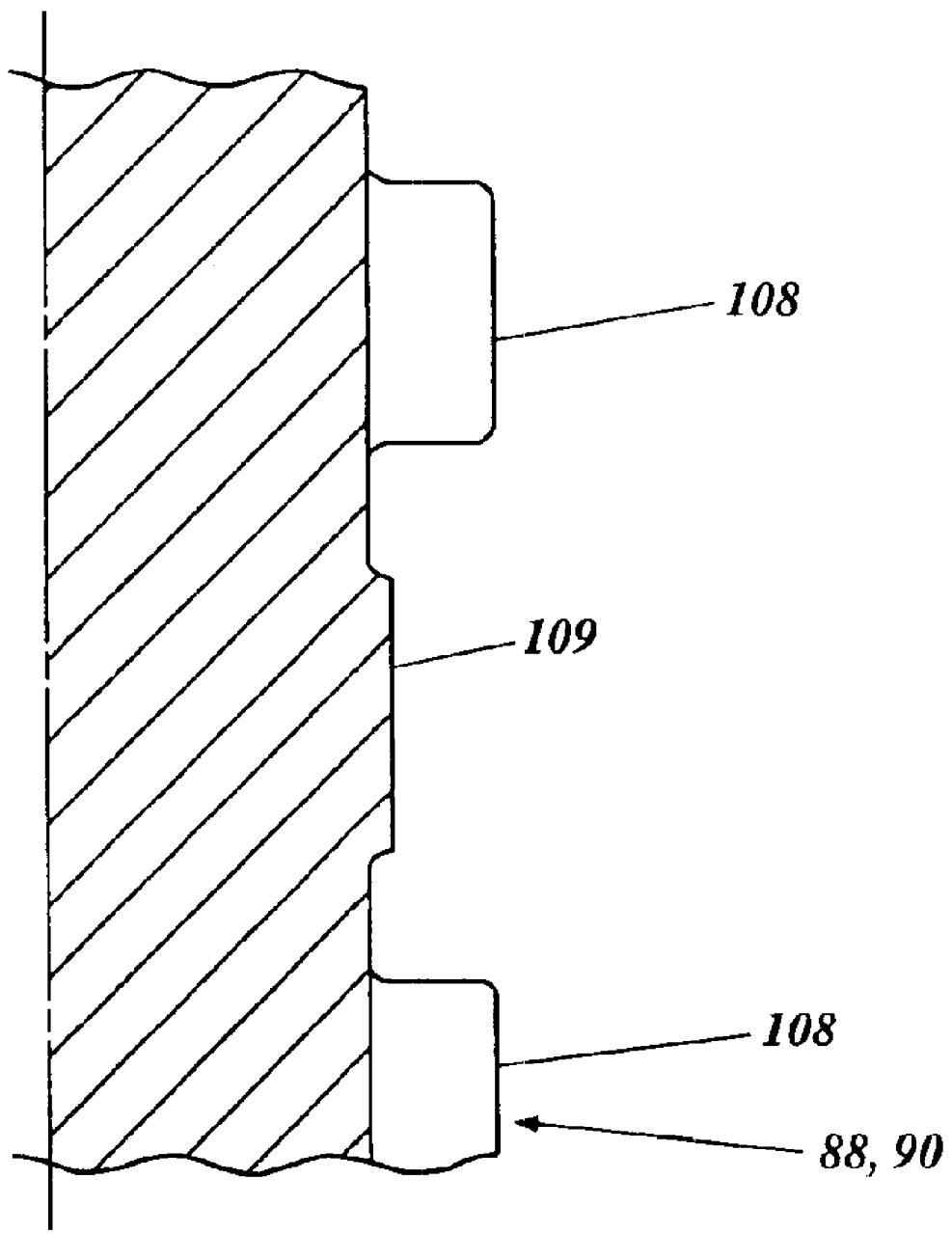
FIG. 8 illustrates a cross-sectional view of the forward or reverse gear taken along the line 8—8 of FIG. 7 extending in a circumferential direction.
Figure 9:
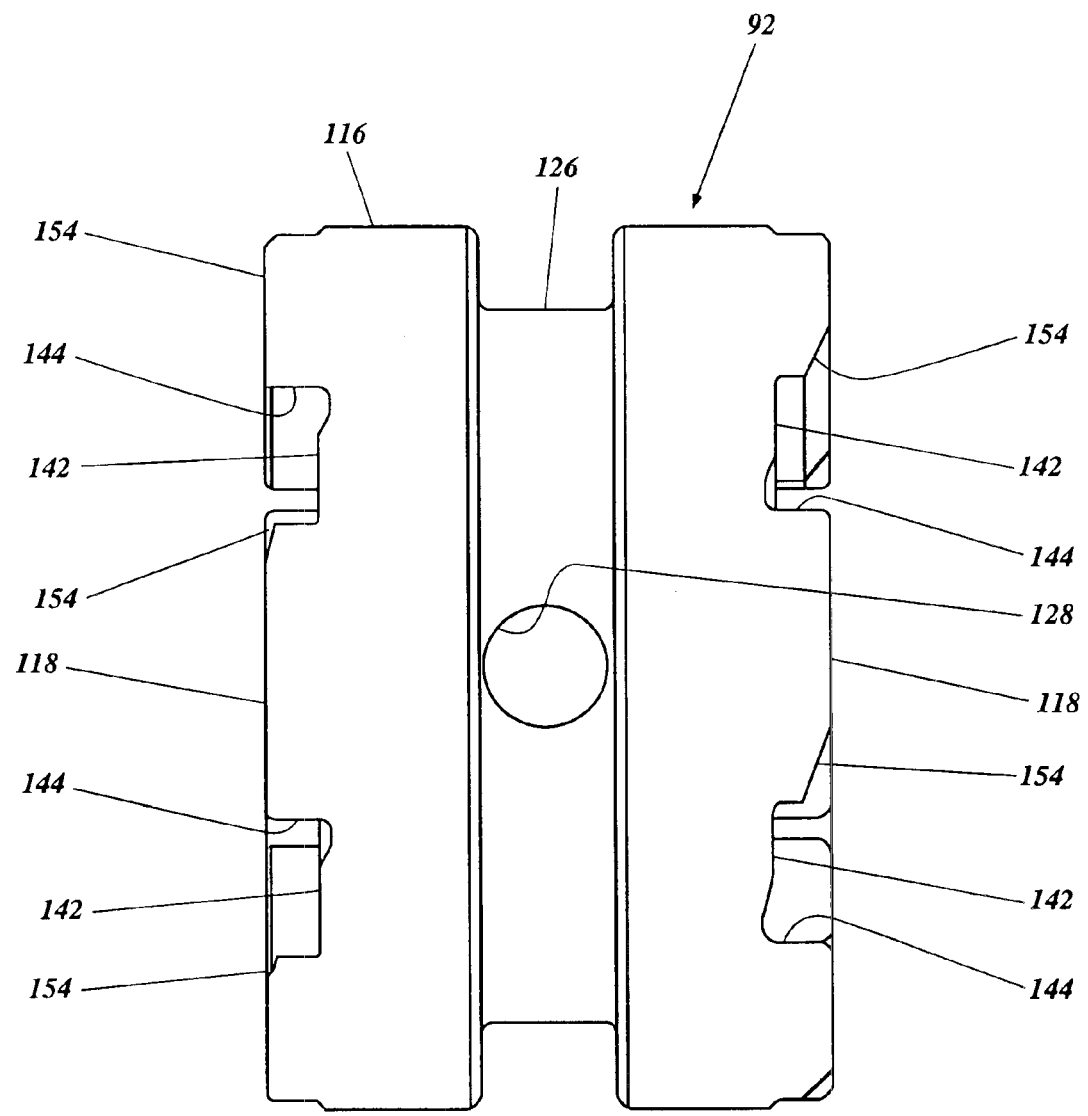
FIG. 9 illustrates a side elevation view of a sleeve of the shift mechanism.
Figure 10:
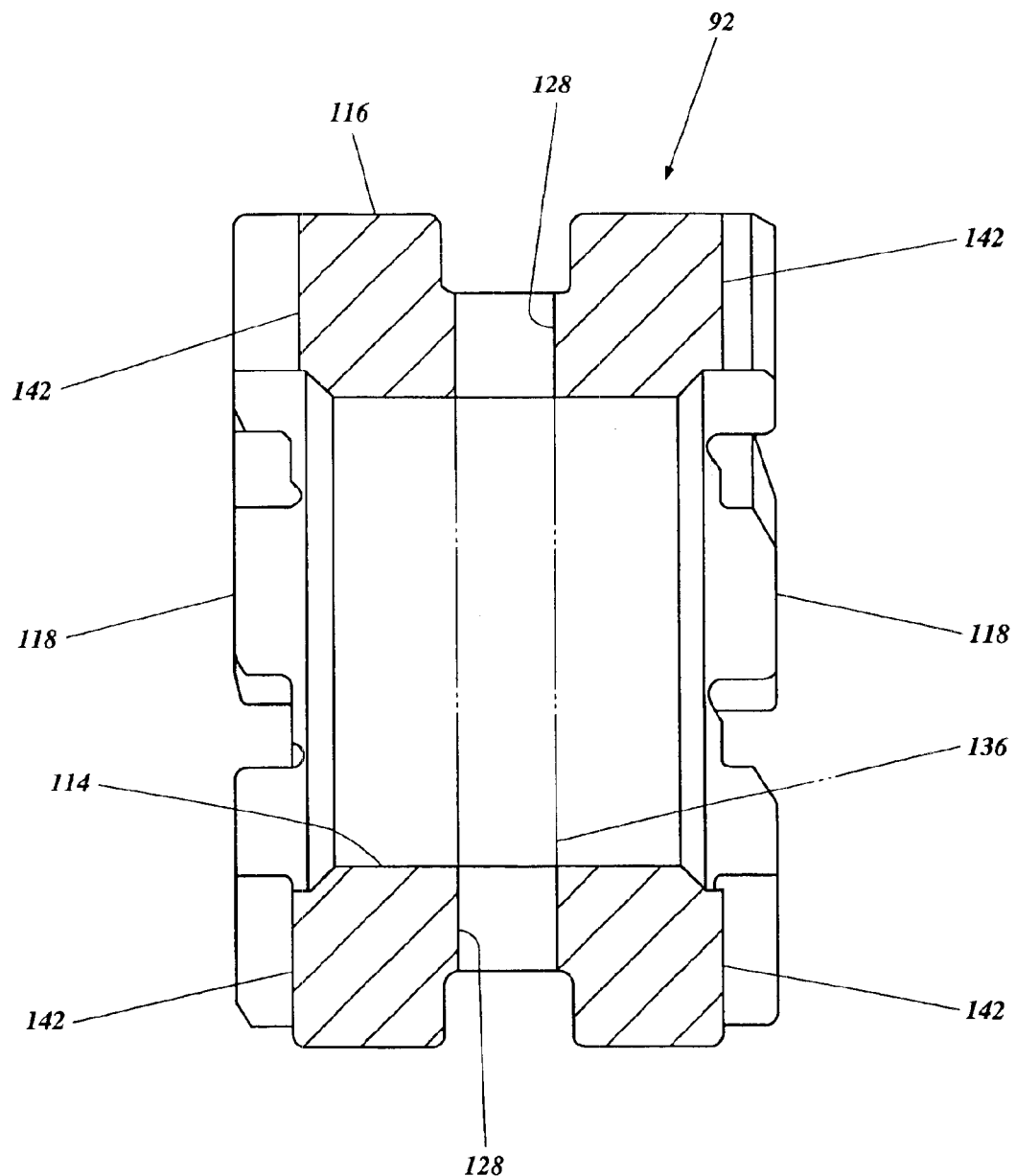
FIG. 10 illustrates a cross-sectional view of the sleeve of FIG. 9.

With reference to FIGS. 4–8, each of the forward and reverse gears 88, 90 preferably has a plurality of teeth 108 on a respective surface 109 that opposes the sleeve 92. The illustrated forward and reverse gears 88, 90 have six teeth arranged at regular intervals in the circumferential direction of the gears 88, 90. Other numbers of teeth also can be used. The teeth 108 also are arranged coaxially with gear teeth 110 such that the gear teeth 110 extend around the teeth 108. In the illustrated arrangement, each tooth 108 is generally configured as a rectangular parallelepiped shape and extends toward the sleeve 92 from the surface 109 as best shown in FIG. 8.

With reference to FIGS. 4 and 9–12, the sleeve 92 preferably is a cylindrical member that has an inner surface 114, an outer surface 116 and side surfaces 118. The inner surface 114 preferably forms a central hollow through which the propulsion shaft 74 extends. Preferably, the propulsion shaft 74 has outer splines 120 on its outer surface, while the sleeve 92 has inner splines 122 on the inner surface 114. The inner splines 122 of the sleeve 92 are coupled with the outer splines 120 of the propulsion shaft 74. Thus, the sleeve 92 can slide on the propulsion shaft 74; however, the sleeve 92 is substantially prevented from rotating relative to the propulsion shaft 74.

The sleeve 92 has a circumferential groove 126 formed generally in a center region of the outer surface 116. A through-hole 128 extends through the sleeve 92 from one portion of the groove 126 to another portion of the groove 126 positioned opposite of each other. The propulsion shaft 74 also has a coaxial recess 130 extending in a forward area of the propulsion shaft 74. A shift plunger 132, which will be described in greater detail below, is fitted into the recess 130. The propulsion shaft 74 has slots 134 facing the recess 130. A pin 134 extends through the through-hole 128, the slots 134 and the shift plunger 132 in the recess 130 to allow the sleeve 92 to move on the propulsion shaft 74 in the distance regulated by the slots 134. A coil spring 138 is placed in the groove 126 to prevent the pin 136 from slipping off.

The sleeve 92 preferably has a plurality of recesses 142 on each side surface 118. The number of the recesses 142 preferably is the same as the number of the teeth 108 of the forward and the reverse gears 88, 90 although other number (e.g., more recesses than teeth) also can be used. In the illustrated embodiment, there are six recesses 142. The recesses 142 are arranged at substantially the same intervals as the teeth 108 in the circumferential direction. The teeth 108 can engage with or be inserted into the recesses 142. Each recess 142 has opposing inner surfaces 144, 146. These surfaces preferably extend generally normal to an imaginary radial plane. In the illustrated embodiment, each tooth 108 abuts on the inner surface 144 at an outer surface 148 thereof while the teeth 108 are positioned within the recesses 142 (see FIG. 13). Thus, each outer surface 148 of each tooth 108 forms a force transferring surface, while each inner surface 144 of each recess 142 forms a force receiving surface. Also, each outer surface 150 of each tooth 108, which is positioned on opposite side of the outer surface 148, and each inner surface 146 of each recess 142 is a non-force transferring or receiving surface in this embodiment.

Figure 11:
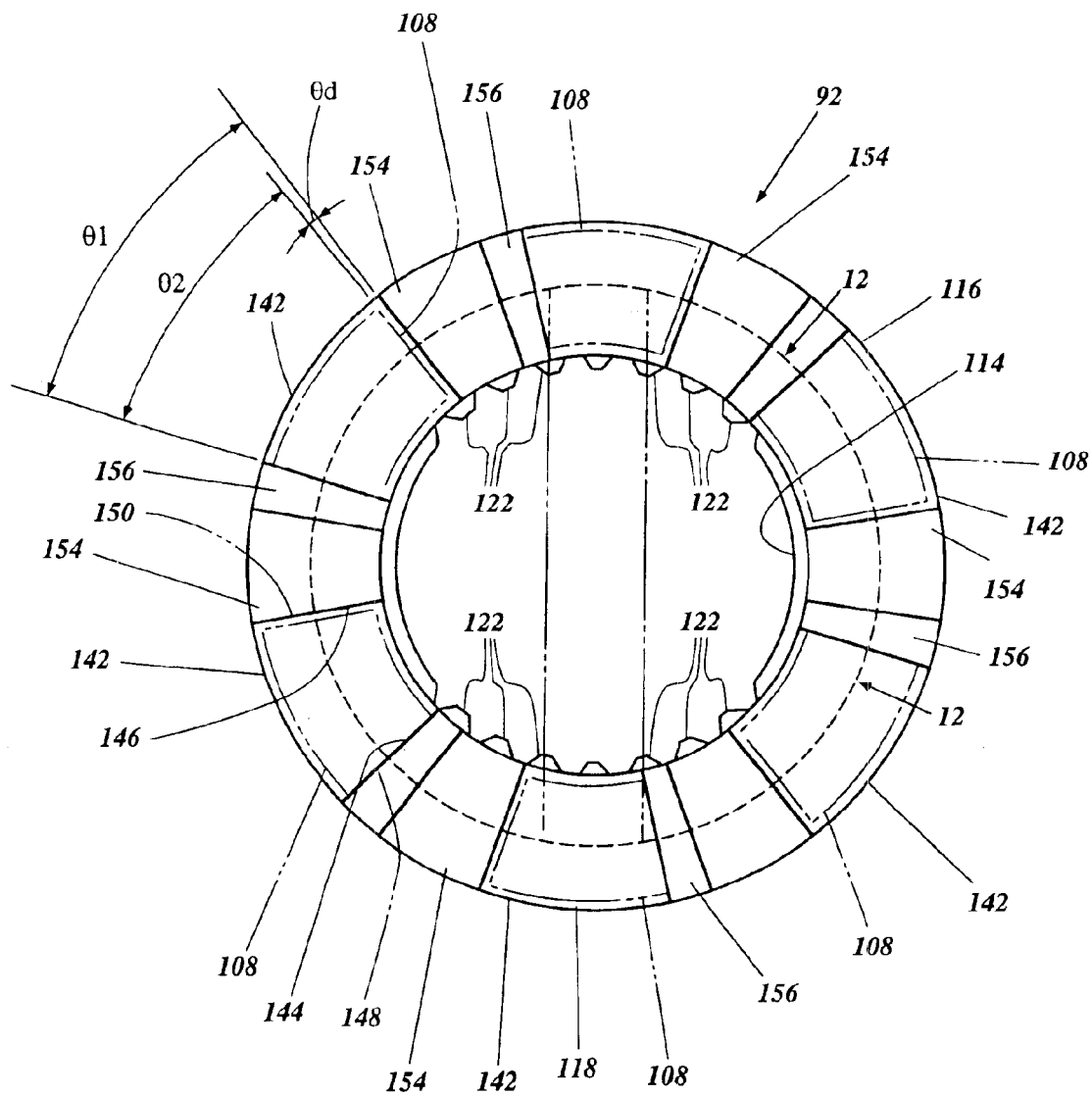
FIG. 11 illustrates a front elevation view of the sleeve of FIG. 9.
Figure 12:
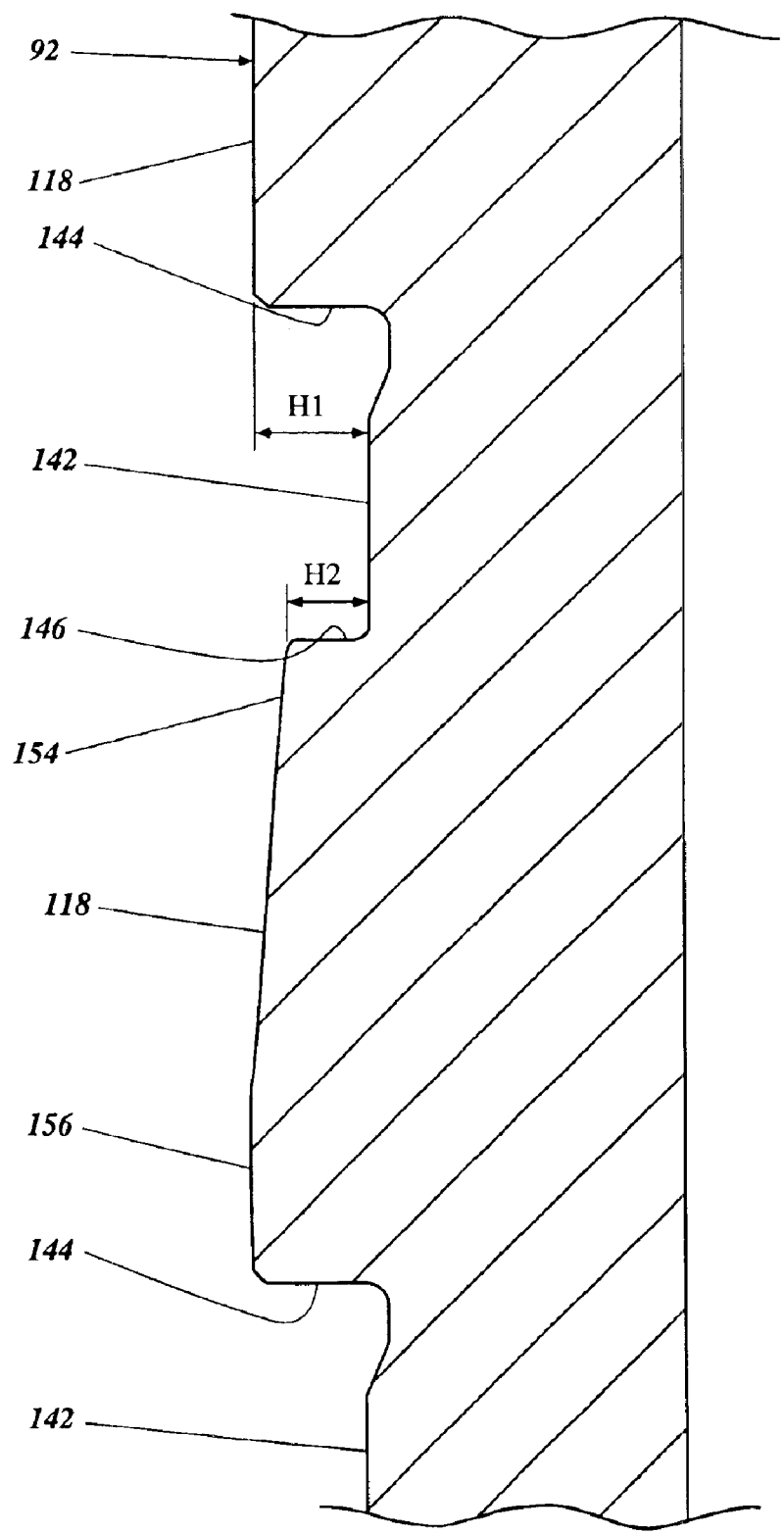
FIG. 12 illustrates a cross-sectional view of the sleeve taken along the line 12—12 of FIG. 11 extending in a circumferential direction.
Figure 13:
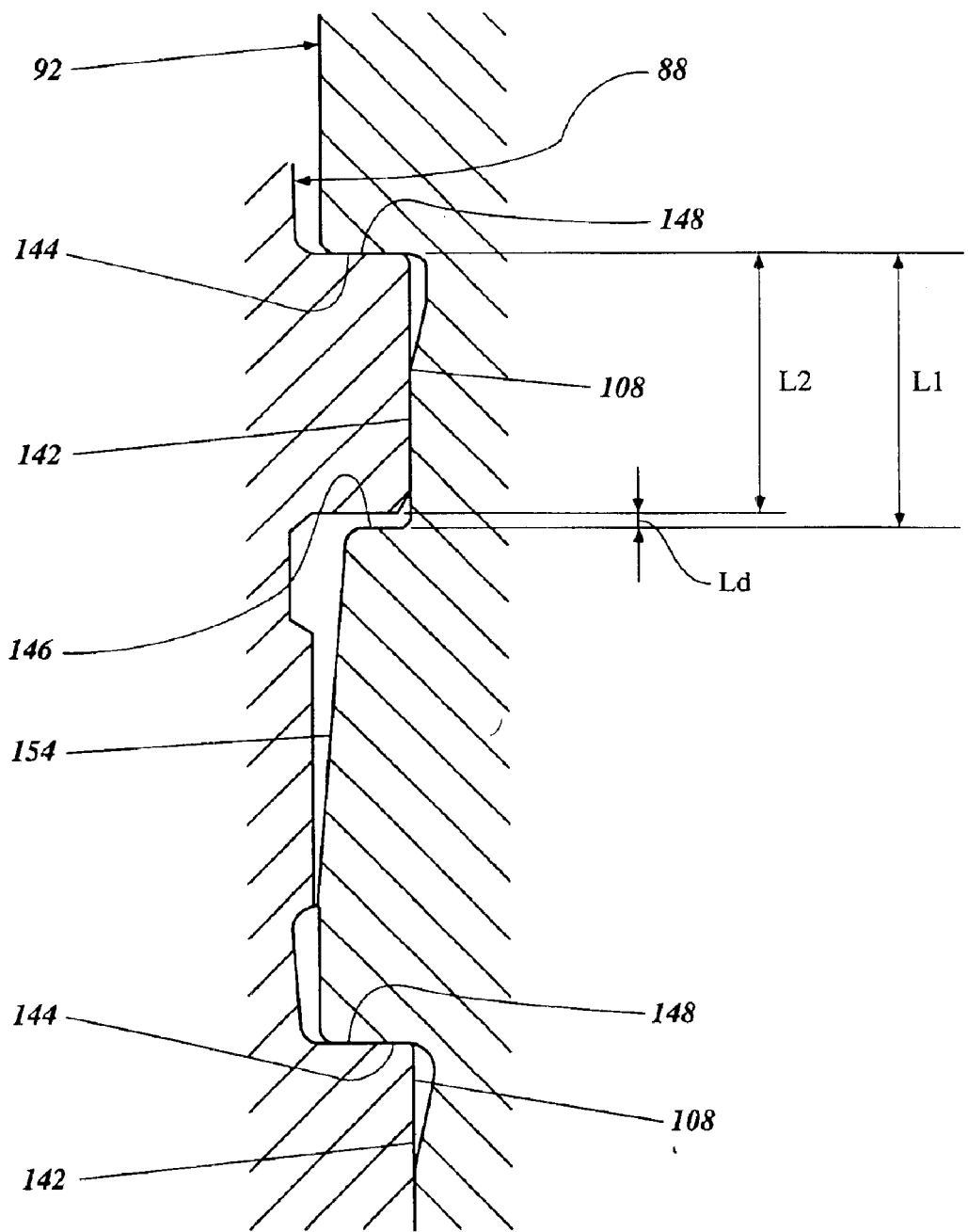
FIG. 13 illustrates a cross-sectional view showing an engagement state of the sleeve and the forward or reverse gear.
Figure 14:
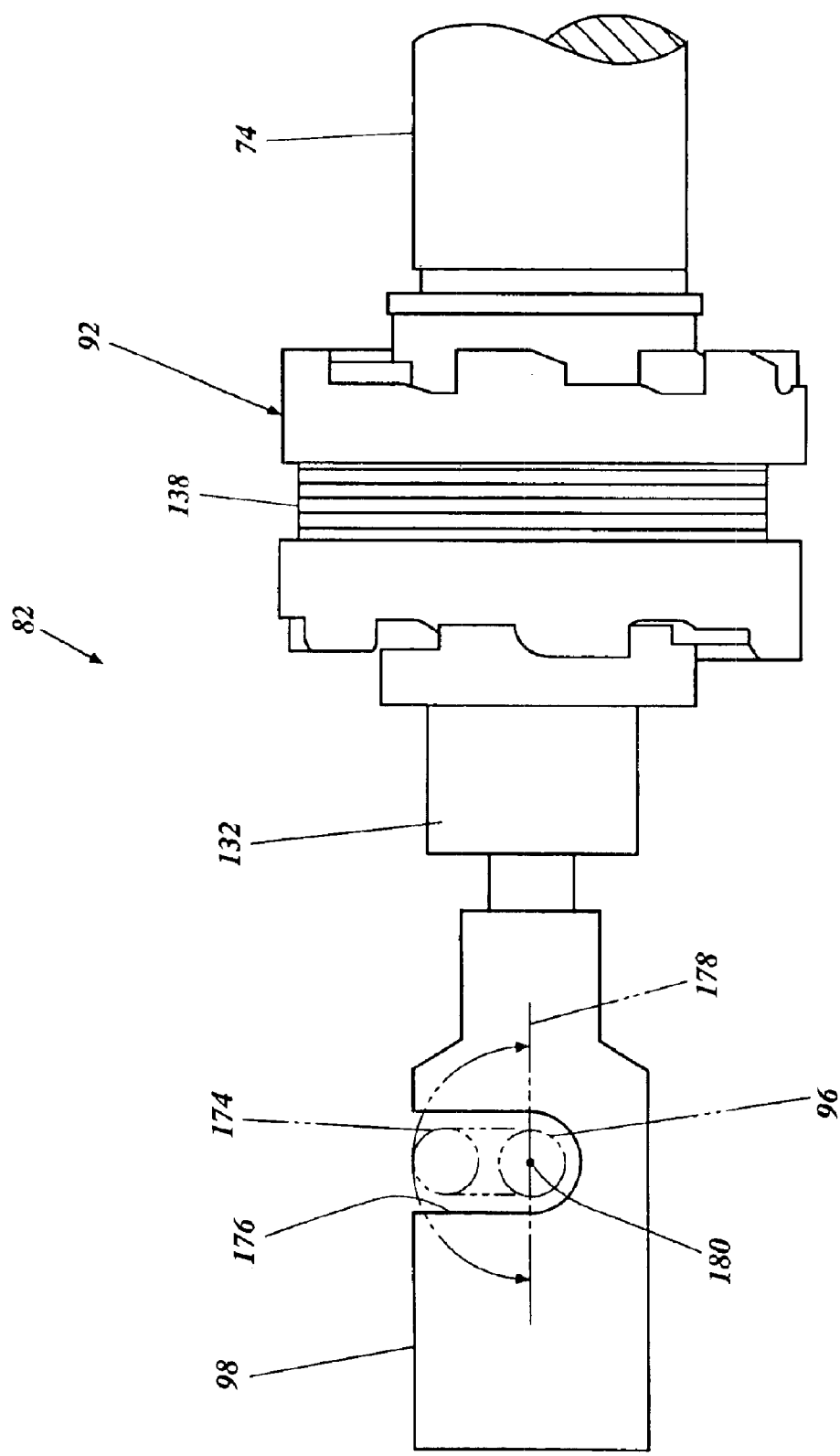
FIG. 14 illustrates a top plan view of the shift mechanism disposed on a propulsion shaft, the forward and reverse gears being removed.
Figure 15:
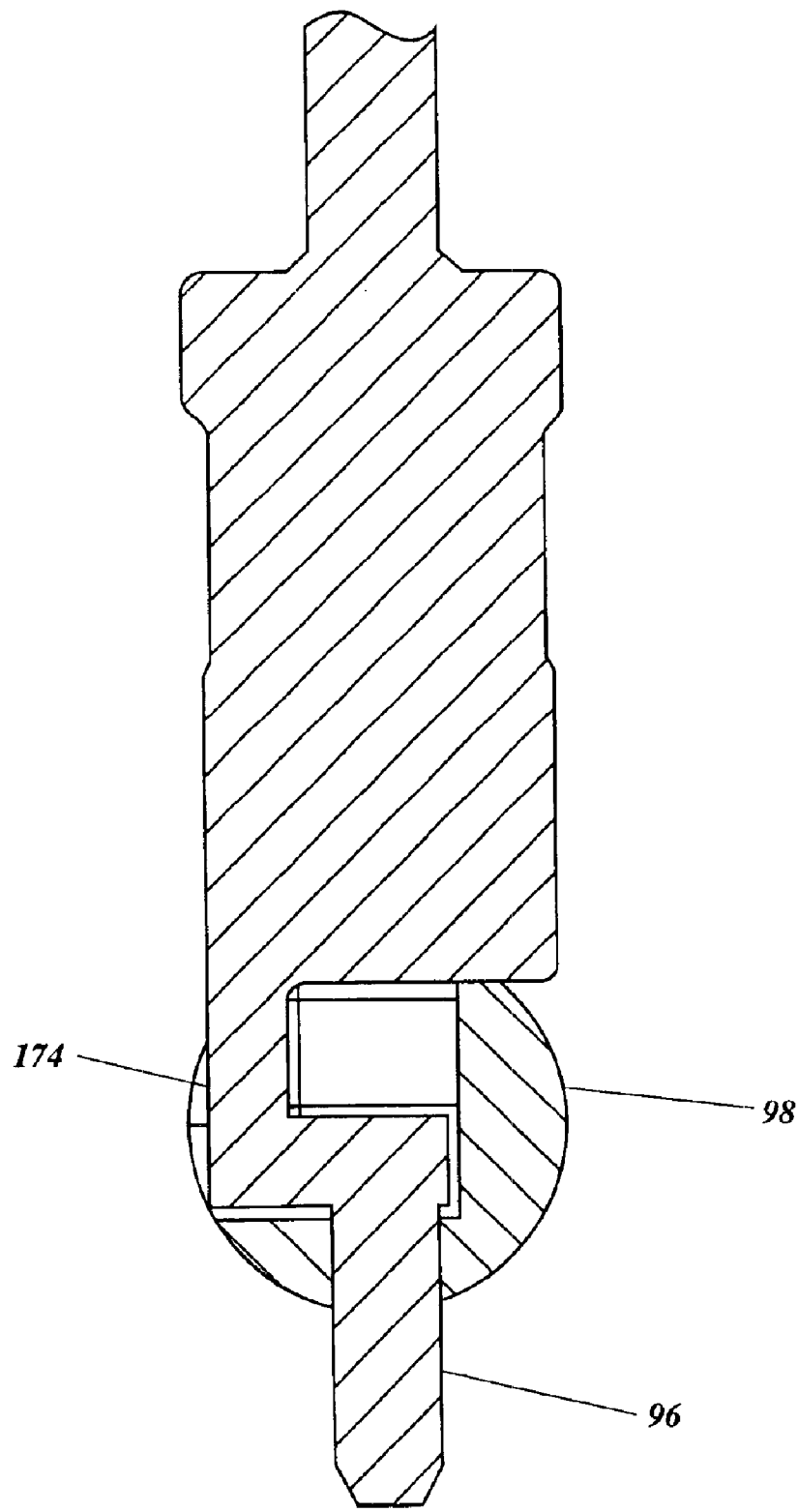
FIG. 15 illustrates a cross-sectional view of the shift mechanism taken along the line 15—15 of FIG. 2.
Figure 16:
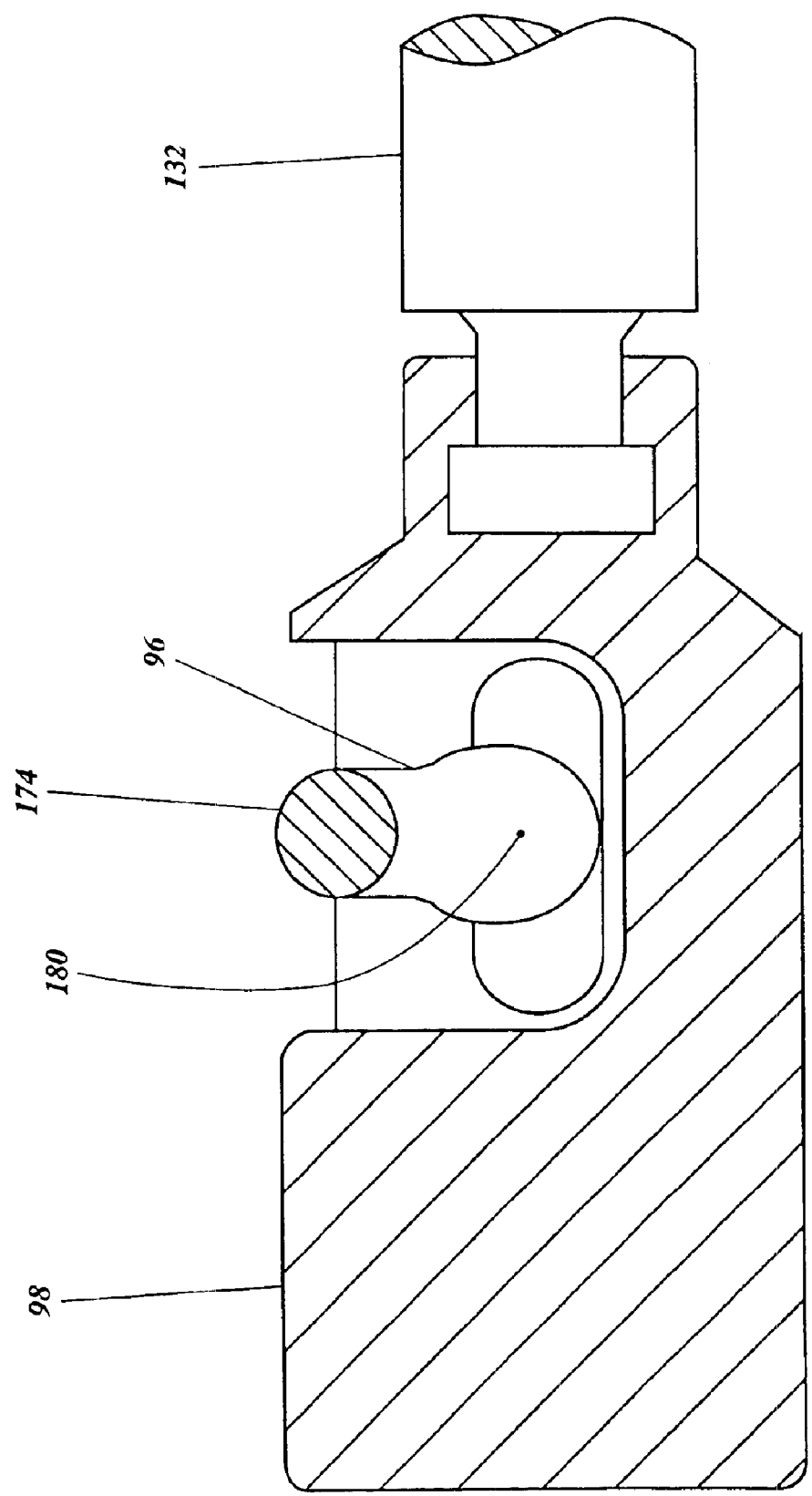
FIG. 16 illustrates a cross-sectional view of the shift mechanism taken along the line 16—16 of FIG. 2.

In the illustrated embodiment, a size of each recess 142 is substantially the same as a size of each tooth 108. Preferably, a length of each recess 142 substantially equals to a length of the associated tooth 108, within a manufacturing tolerance, in the circumferential direction or, in some configurations, the length of the recess 142 is slightly larger than the length of the tooth 108. In one embodiment, if an angular distance between the opposing inner surfaces 144, 146 of each recess 142 is θ1 and an angular distance between the outer surfaces 148, 150 of each tooth 108 is θ2, a clearance or difference θd preferably is greater than zero and less than about three degrees (0°<θd=θ1−θ2<3°) as shown in FIG. 11. Also, as shown in FIG. 13, if a distance between the opposite inner surfaces 144, 146 of each recess 142 is L1 and a distance between the outer surfaces 148, 150 of each tooth 108 is L2, a clearance or difference Ld preferably is greater than zero and less than about 1.21 millimeters (0 mm<Ld=L1−L2<1.21 mm). The clearances are helpful for the teeth 108 to withdraw from the recesses 142 but too large of clearances causes significant noise.

The clearances θd and Ld are small enough in this embodiment to confine each tooth 108 in the associated recess 142 and to allow the tooth 108 to remain substantially stationary in the circumferential direction. Even if the teeth 108 can move within the recesses 142 and can collide with the inner surfaces 144, 146, the noise made by the collision can be sufficiently small due to the greatly reduced travel allowed. As described above, such collisions, if any, generally are made while the forward or reverse gear 88, 90 fluctuates in its rotation. This is because, for example, the driveshaft 72 is directly coupled with the crankshaft that varies in its rotational speed due to normal fluctuations in the engine's combustion cycles and also due to irregular combustion that occurs in combustion chambers of the engine.

It should be noted that the size of the clearances can vary in accordance with sizes of the gears, the sleeve, each tooth and each recess.

Each side surface 118 of the sleeve 92 preferably has slopes 154 next to the non-force receiving surfaces 146. In the illustrated embodiment, each slope 154 starts at a location close to each force receiving surface 144 and ends at each non-force receiving surface 146. The balance of each side surface 118 preferably forms a flat area 156. The slopes 154 can help the teeth 108 gradually and smoothly approach the recesses 142. As shown in FIG. 13, after the engagement of the teeth 108 with the recesses 142 completes, the force transferring surfaces 148 of the teeth 108 abut on the force receiving surfaces 144 of the recesses 142. The sleeve 92 thus is coupled with the forward or reverse gear 88, 90 and can be rotated by the forward or reverse gear 88, 90 together with the propulsion shaft 74, which is already coupled with the sleeve 92 through the spline connection.

Preferably, the length of each slope 154 is larger than the length of each associated flat area 156. In other words, each slope 154 extends beyond at least a half of the length between one recess 142 and a next recess 142. More preferably, each slope 154 occupies an area larger than a third of the area between one recess 142 and a next recess 142.

In the illustrated embodiment, if a depth of each recess 142 between the flat area 156 and a bottom of the recess is H1 and an a depth of the recess 142 between the slope 154 and the bottom of the recess is H2, a depth ratio Hd between the depth H2 and the depth H1 preferably is 0.49 through 0.62 (H2/H1=0.49–0.62). This is because the depth ratio Hd in the range can improve the likelihood that the recesses 142 will securely hold the teeth 108 therein while the slopes 154 have an inclination sufficient to assist the collar in locking with the gear. More specifically, if the depth ratio Hd is greater than this range, the teeth 108 are more likely to slip off the surfaces of the recesses 142 from the non-force receiving surface 146 when the forward or reverse gear 88 90 fluctuates in rotation. Also, if the depth ratio Hd is less than the range, the slopes 154 generally do not sufficiently guide the teeth 108 toward the recesses 142.

Figure 5:
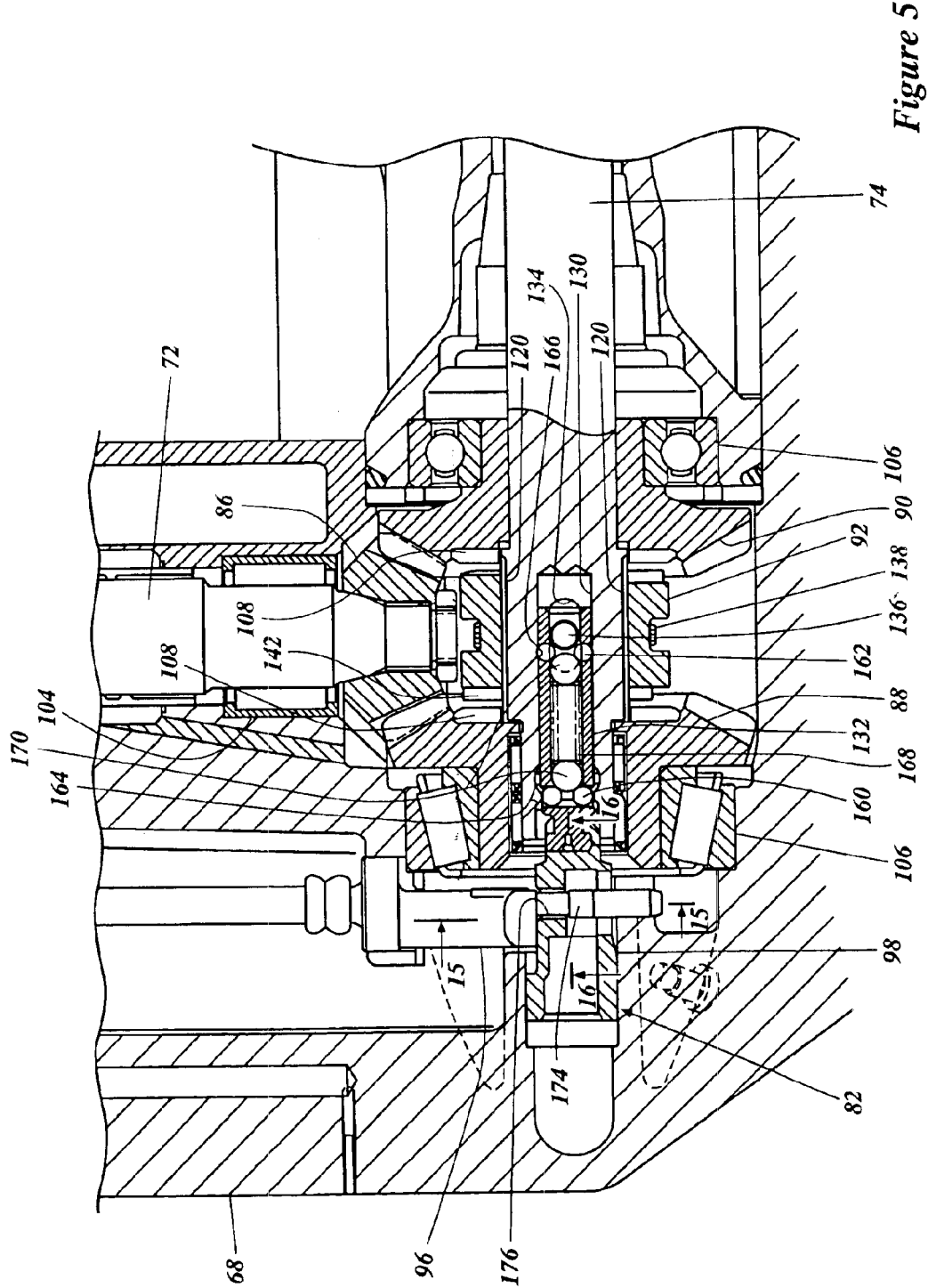
FIG. 5 illustrates a cross-sectional side elevation view of a lower unit of the outboard motor of FIG. 1 that incorporates a major portion of a shift mechanism.
Figure 6:
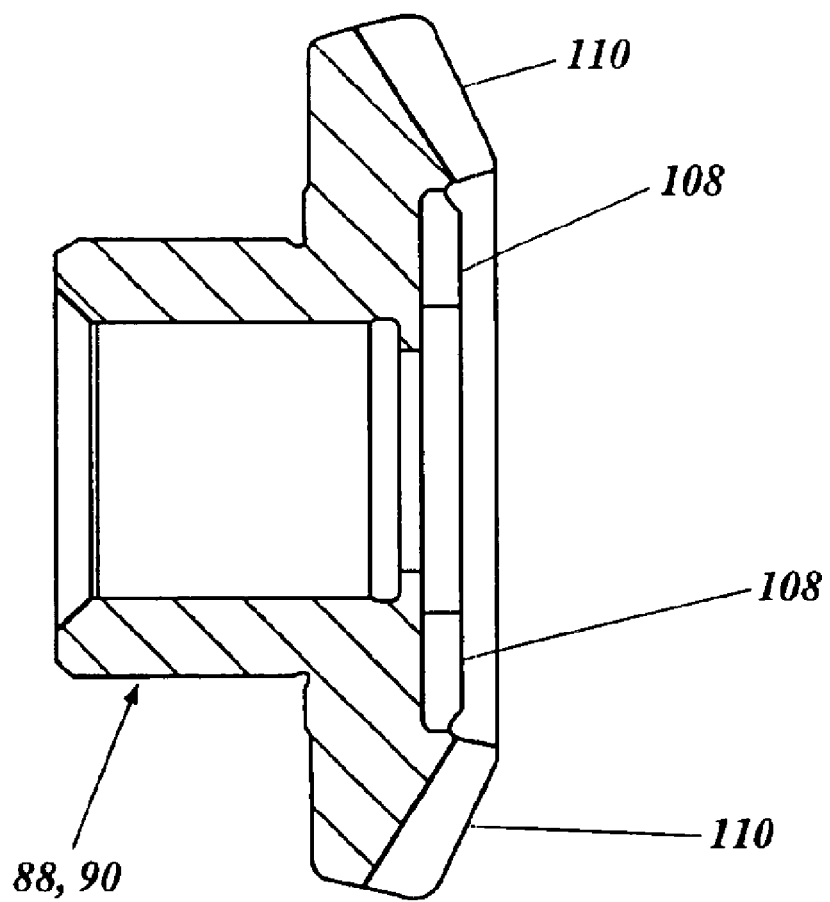
FIG. 6 illustrates a cross-sectional side elevation view of a forward or reverse gear of the shift mechanism of FIG. 5.
Figure 7:
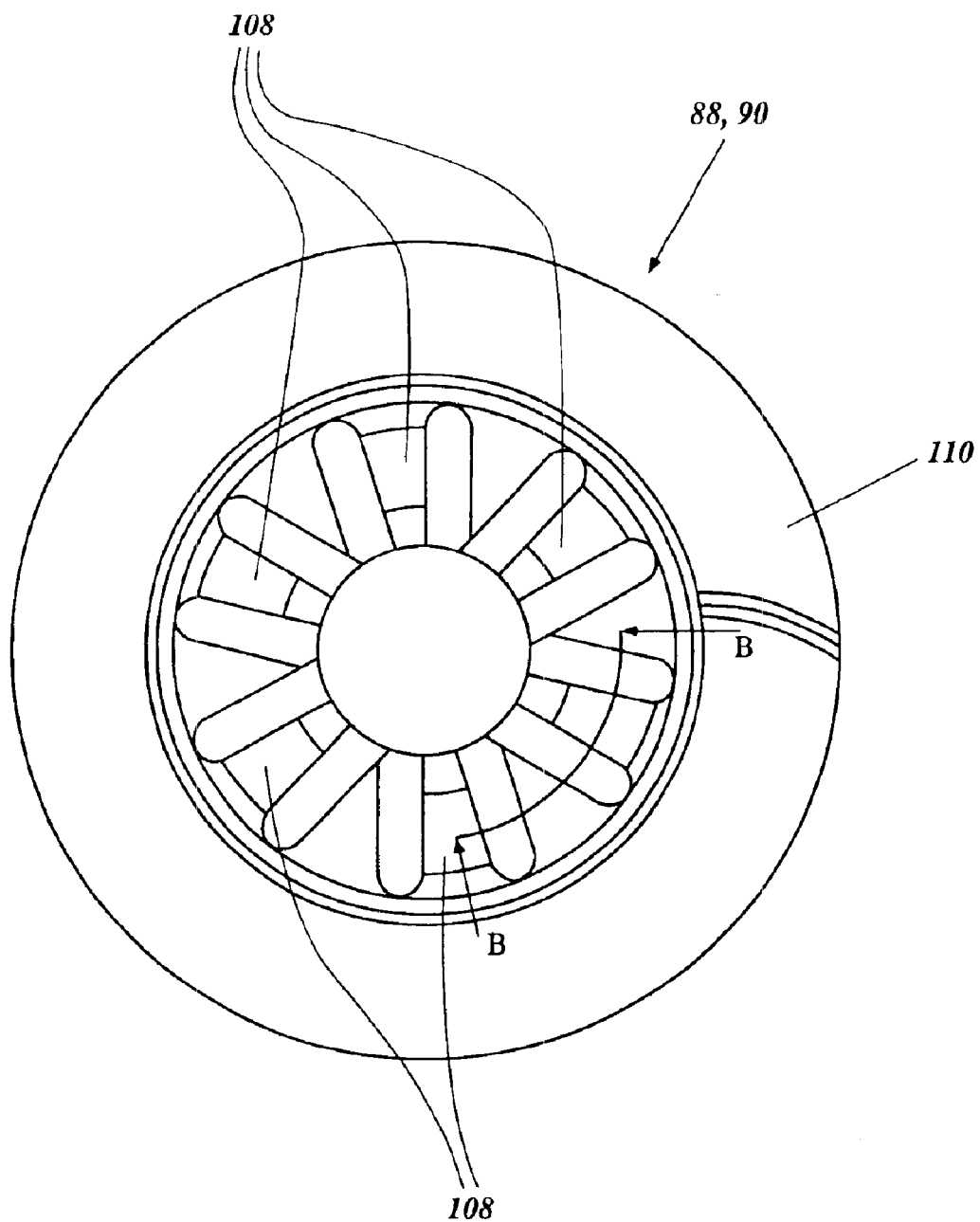
FIG. 7 illustrates a front elevation view of the forward or reverse gear of FIG. 6.

With reference to FIG. 5, the shift plunger 132 is coupled with the actuating cam follower 98 in a manner such that the shift plunger 132 can move axially within the coaxial recess 130 when the cam follower 98 is moved. For example, a forward end of the plunger 132 is nested in a recessed portion formed at a rear end of the cam follower 98. The plunger 132 preferably has two sets of detent balls 160, 162 axially spaced apart from each other. The detent balls 160, 162 are positioned in holes of the plunger 132 to radially move in and out the holes. An inner surface of the coaxial recess 130 has small depressions 164, 166 spaced apart from each other. The depressions 164 are located close to each other. Also, the depressions 164 are positioned close to the detent balls 160, while the depression 166 is positioned close to the detent balls 162. When the detent balls 160 are in one of the depressions 164, the detent balls 162 are out of the depression 166. Meanwhile, when the detent balls 162 are in the depression 166, the detent balls 160 are out of both the depressions 164. A coil spring 168 urges larger balls 170 toward the detent balls 160, 162 to keep set positions.

In the illustrated embodiment, the sleeve 92 does not engage with either the forward or reverse gear 88, 90 and the transmission 78 is in the neutral mode when the detent balls 162 are in the depression 166. The sleeve 92 engages with the forward gear 88 and the transmission 78 is in the forward mode when the detent balls 160 are in one of the depressions 164 located close to the cam follower 98. The sleeve 92 engages with the reverse gear 90 and the transmission 78 is in the reverse mode when the detent balls 160 are in the other depression 164. The detent mechanism discussed above advantageously provides a snap action in addition to surely holding the selected modes.

With reference to FIGS. 5 and 14–16, the shift actuator 96 preferably has a cam portion 174 that has a crank shape. The cam follower 98 in turn has a recess 176 that extends normal to an axis of the cam follower 98 and opens toward the starboard side of the cam follower 98. The cam portion 74 extends through the recess 176 and can pivot about a pivot axis 180 that extends generally vertically and crosses the axis 98 of the cam follower 98. The movement of the cam portion 74 urges the cam follower 98 to move axially. Thus, the shift plunger 132 moves back and forth within the coaxial recess 130.

With particular reference to FIGS. 4 and 5, and with additional reference to FIGS. 17(a)–(e), the operator operates the shift lever 100 to set the transmission 78 to the forward, reverse or neutral mode. The shift rod 96 pivots about its axis. The cam portion 174 of the shift rod 96 thus urges the cam follower 98. The shift plunger 132 thus moves axially. Because the plunger 132 carries the sleeve 92 through the detent mechanism including the pin 136, the sleeve 92 moves together with the shift plunger 132. The recesses 142 of the sleeve 92 thus can engage with the teeth 108 of the forward or reverse gear 88, 90.

With reference to FIGS. 17(a)–(e), a process in which the sleeve 92 engages with the forward gear 88, for example, is described below. A process in which the sleeve 92 engages with the reverse gear 88 is similar to this process.

Figures 17A, 17B, 17C, 17D, 17E:
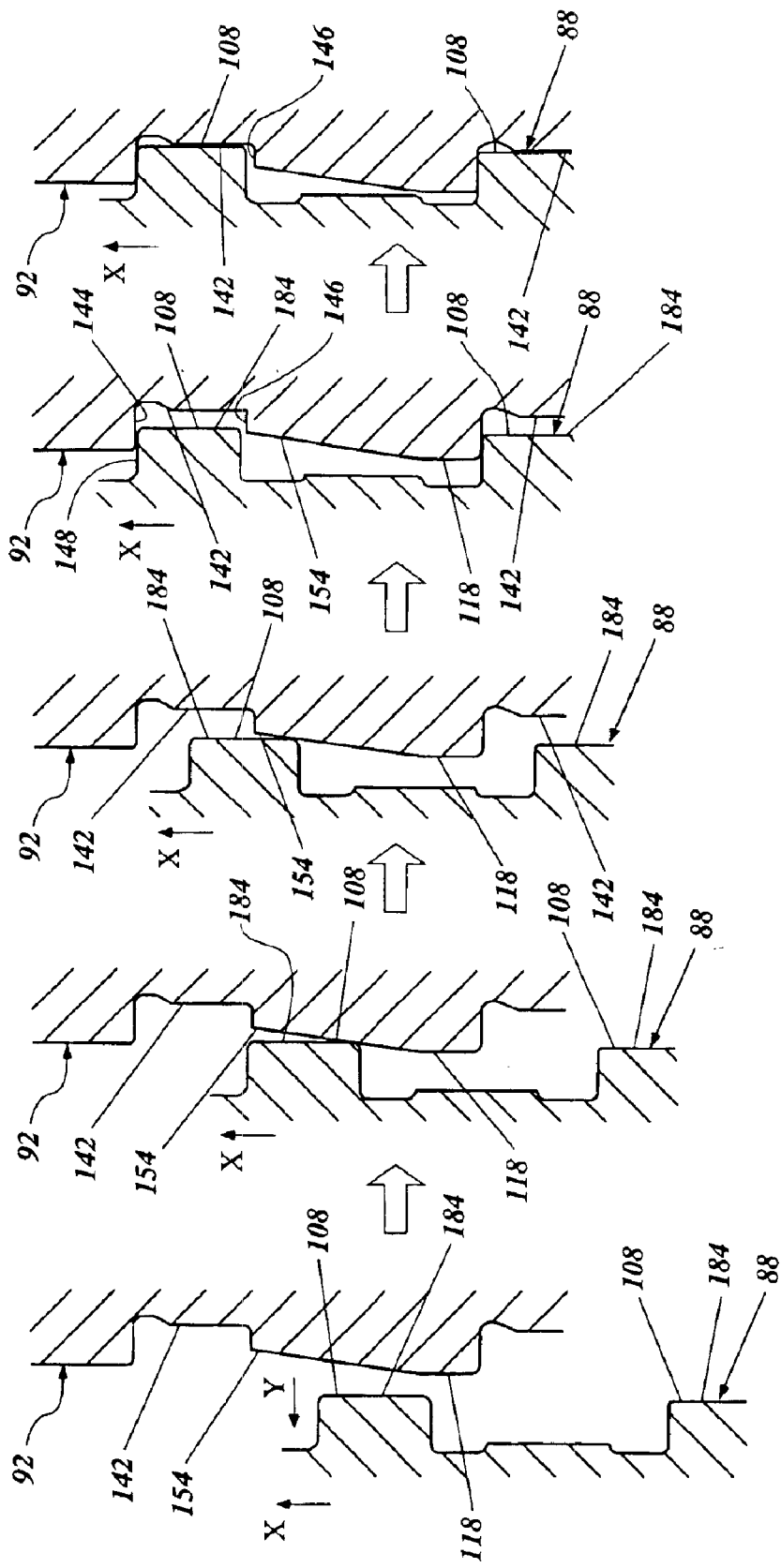
FIGS. 17(a)–(e) illustrate schematic views showing how the sleeve and the forward or reverse gear engage with each other, FIG. 17(a) showing an initial state in which the sleeve is approaching the forward or reverse gear, FIGS. 17(b)–(d) showing mid states proceeding in this order, and FIG. 17(e) showing the last state in which the engagement is completed.

In FIG. 17(a), the forward gear 88 rotates with the pinion 86 of the driveshaft 72 in a relatively fast speed in the direction X. The sleeve 92 is approaching to the forward gear 88 in the direction Y. The sleeve 92 does not rotate or can rotate much slower than the forward gear 88 under this condition. In FIG. 17(b), because the sleeve 92 reaches the forward gear 88, top surfaces 184 of the teeth 108 of the forward gear 88 starts sliding on the slopes 154 of the sleeve 92. The sleeve 92 moves further toward the forward gear 88 and the teeth 108 come near to the recesses 142 by sliding over the slopes 154 as shown in FIG. 17(c). In FIG. 17(d), the force transferring surfaces 148 of the teeth 108 abut on the force receiving surfaces 144. The sleeve 92 thus starts rotating with the forward gear 88. In FIG. 17(e), the teeth 108 completely engage with the recesses 142 and the sleeve 92 no longer moves in the direction Y. The sleeve 92 rotates with the forward gear 88 in unison under the condition.

Because the teeth 108 can gradually approach the recesses 142 along the relatively long and gentle slopes 154 in the illustrated embodiment, the engagement process is softer and smoother than conventional engagement processes (FIGS. 17(b) and (c)).

As discussed above, the forward gear 88 may fluctuate back and forth in the circumferential direction (i.e., in the direction X or opposite direction) after the engagement of the teeth 108 with the recesses 142 has completed (FIG. 17(e)). In the illustrated embodiment, each recess 142 has substantially the same size as the associated tooth 108. The recesses 142 thus can almost completely confine the teeth 142 therein or can allow the teeth 142 to move in the nominal distance. In other words, the teeth 108 are almost completely inhibited from repeating separation and collision with the recesses 142. Thus, the illustrated arrangement reduces the noise level during operation dramatically.

Figure 19:
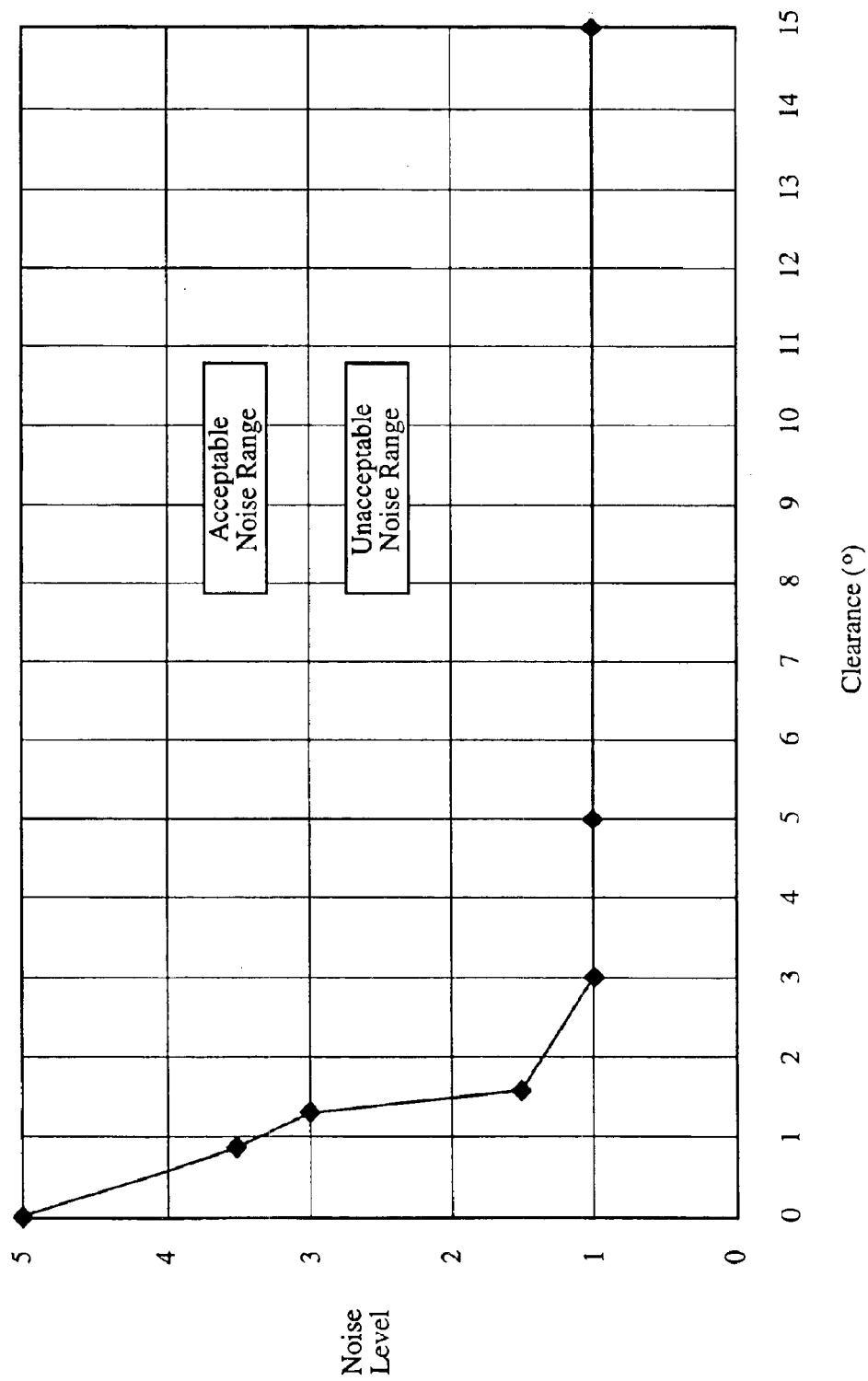
FIG. 19 is a graph corresponding to the table of FIG. 18.
Figure 21:
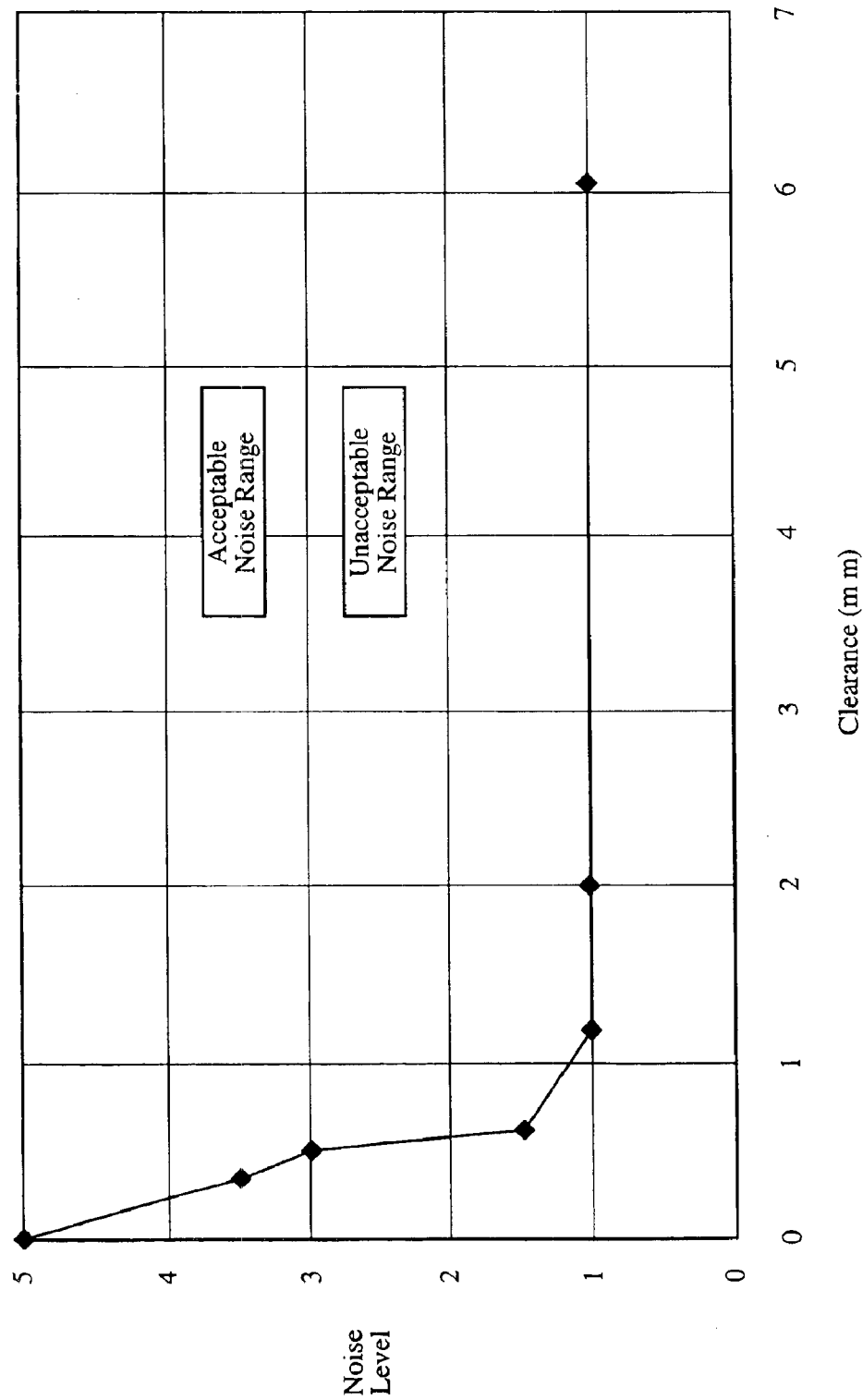
FIG. 21 is a graph corresponding to the table of FIG. 20.

With reference to FIGS. 18–21, a test result is described below. FIGS. 18 and 19 show noise levels versus clearances by angle, while FIGS. 20 and 21 show the same noise levels versus clearances by length. The test was made using forward and reverse gear samples and a sleeve sample. The samples had six teeth or six recesses arranged every 60 degrees. Each tooth of the forward and reverse gears had a size 19.2° in angle measured in the circumferential direction. Different sleeves were employed to provide various clearances between the tooth and associated recesses. The noise levels were measured at an engine speed of about 650 rpm.

In the tables and graphs of FIGS. 18–21, the noise levels are improved if a larger number is shown. For example, noise level 5 is better than noise level 3.5. Noise levels 3 and greater than 3 belong to an acceptable noise range. In other words, if noise level is less than 3, the noise level belongs to an unacceptable noise range. Thus, noise level 3 preferably prescribes the upper limit of tolerance of the clearance. The upper limit of the tolerance can be given at an angle of about 1.29° or at a length of about 0.52 mm. The teeth were welded to the recesses to make the clearance 0° or 0 mm in the test. Also, a clearance in a conventional arrangement is about 15° or about 6.05 mm.

As shown in the tables and graphs, if the clearance angles are greater than about 3° or the clearance lengths are greater than about 1.21 mm, the noise levels cannot be improved and remain at noise level 1. However, smaller clearances can provide improvements, more or less. Thus, the clearance angle preferably is 3° or less, or the clearance length preferably is about 1.21 mm.

The noise reducing effect described above is particularly advantageous for four-cycle engines. This is because generally noise produced by the four-cycle engines is smaller than noise produced by two-cycle engines. The noise made by collisions of the teeth of forward or reverse gear with the recesses of the sleeve thus is not covered by the engine noise level and can bother the operator or passengers of the associated watercraft especially when the engine operates at a relatively slow speed.

In some alternative arrangements, the housing unit can support the driveshaft using an elastic member such as, for example, a wave washer. This construction inhibits the driveshaft from fluctuating up and down. As a result, noise made by such a fluctuation of the driveshaft can be reduced and total noise level can be lowered further.

Also, smaller backlash between the pinion and the forward or reverse gear can reduce the noise level of the transmission further. Particularly, smaller backlash between the pinion and the reverse gear can bring better noise reduction effect.

Although this invention has been disclosed in the context of a certain preferred embodiment, it will be understood by those skilled in the art that the present invention extends beyond the specifically disclosed embodiment to other alternative embodiments and/or uses of the invention and obvious modifications and equivalents thereof. In particular, while the present transmission has been described in the context of a particularly preferred embodiment, the skilled artisan will appreciate, in view of the present disclosure, that certain advantages, features and aspects of the transmission may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. For instance, the teeth can be formed on the sleeve and the recesses can be formed on the gear or both the sleeve and the gear can each comprise teeth and recesses. Thus, it is intended that the scope of the present invention herein disclosed should not be limited by the particular disclosed embodiment described above, but should be determined only by a fair reading of the claims that follow.

What is claimed is:

1. A marine propulsion unit comprising a first shaft adapted to be driven by a prime mover, a second shaft driven by the first shaft, the second shaft driving a propulsion device, the first shaft carrying a first gear, the second shaft carrying second and third gears, the first gear meshing with the second and third gears, the first gear driving the second and third gears in opposite directions relative to each other, a sleeve rotatable with the second shaft, the sleeve being slidably disposed on the second shaft between the second and third gears, the second and third gears each having a tooth on a surface thereof that opposes the sleeve, the sleeve having a recess on each surface thereof that opposes the second or third gear, each tooth being capable of insertion into the associated recess, each tooth having a length substantially the sarne as a length of the associated recess in a circumferential direction.

2. The marine propulsion unit as set forth in claim 1, wherein the length of each tooth is slightly smaller than the length of the associated recess.

3. The marine propulsion unit as set forth in claim 1, wherein each tooth slides along the surface of the sleeve that is adjacent the recess before entering the associated recess, the surface having a slope that guides each tooth toward the associated recess.

4. The marine propulsion unit as set forth in claim 3, wherein the second and third gears have a plurality of teeth on the surface thereof that opposes the sleeve, the plurality of teeth are spaced apart from each other at regular intervals, the sleeve having a plurality of recesses on each surface thereof that opposes the second or third gear, the plurality of recesses are spaced apart from each other at regular intervals, the sleeve further comprising a sloping surface positioned between each pair of adjacent recesses.

5. The marine propulsion unit as set forth in claim 3, wherein the second and third gears have a plurality of teeth on the surface thereof that opposes the sleeve, the plurality of teeth are spaced apart from each other, the sleeve having a plurality of recesses on each surface thereof that opposes the second or third gear, the plurality of recesses are spaced apart from each other with a sloped surface positioned therebetween each sloped surface extending from a location close to an end of one of the plurality of recesses to an end of another one of the plurality of recesses that is positioned next to the one of the plurality of the recesses.

6. The marine propulsion unit as set forth in claim 1 additionally comprising an internal combustion engine that operates on a four stroke cycle principle, the engine driving the first shaft.

7. A marine propulsion unit comprising a first shaft adapted to be driven by a prime mover, a second shaft driven by the first shaft, the second shaft driving a propulsion device, the first shaft carrying a first gear, the second shaft carrying a second gear, the first gear meshing with the second gear, a sleeve rotatable with the second shaft, the sleeve being slidably disposed on the second shaft, the second gear having a tooth on a surface thereof that opposes the sleeve, the sleeve having a recess on a surface thereof that opposes the second gear, the tooth being arranged to selectively mesh with the recess, and the tooth having a length substantially the same as a length of the recess in a circumferential direction.

8. A marine propulsion unit comprising a first shaft adapted to be driven by a prime mover, a second shaft driven by the first shaft, the second shaft driving a propulsion device, the first shaft carrying a first gear, the second shaft carrying a second gear, the first gear meshing with the second gear, the first gear driving the second gear, a sleeve rotatable with the second shaft, the sleeve being slidably disposed on the second shaft adjacent the second gear, the second gear having a tooth on a surface thereof that opposes the sleeve, the sleeve having a recess on a surface thereof that opposes the second gear, the tooth being adapted to enter the recess, the recess substantially confining the tooth against circumferential movement relative to the recess when the tooth is in the recess.

* * * * *

UNITED STATES PATENT AND TRADEMARK OFFICE
CERTIFICATE OF CORRECTION

| | |
|---|---|
| PATENT NO. | : 6,893,305 B2 |
| APPLICATION NO. | : 10/899905 |
| DATED | : May 17, 2005 |
| INVENTOR(S) | : Noriyuki Natsume et al. |

It is certified that error appears in the above-identified patent and that said Letters Patent is hereby corrected as shown below:

Col. 11, Line 18, delete "sarne" and insert therefore, --same--.

Signed and Sealed this

Seventeenth Day of November, 2009

David J. Kappos
*Director of the United States Patent and Trademark Office*